(12) United States Patent
Schimmel et al.

(10) Patent No.: US 7,930,321 B2
(45) Date of Patent: Apr. 19, 2011

(54) REFERENCE ARCHITECTURE FRAMEWORK

(75) Inventors: Richard A. Schimmel, Glenmont, NY (US); Robert Paul Nieman, Loudonville, NY (US); Terrence Christopher Lynch, Jacksonville, FL (US); Philip Howard Quinlan, Concord, CA (US)

(73) Assignee: Bank of America Corporation, Charlotte, NC (US)

( * ) Notice: Subject to any disclaimer, the term of this patent is extended or adjusted under 35 U.S.C. 154(b) by 387 days.

(21) Appl. No.: 11/932,381

(22) Filed: Oct. 31, 2007

(65) Prior Publication Data

US 2009/0112912 A1 Apr. 30, 2009

(51) Int. Cl.
*G06F 17/30* (2006.01)
(52) U.S. Cl. ...................................................... 707/803
(58) Field of Classification Search .................. None
See application file for complete search history.

(56) References Cited

U.S. PATENT DOCUMENTS

| | | | |
|---|---|---|---|
| 2004/0049372 A1 | 3/2004 | Keller | |
| 2004/0049509 A1 | 3/2004 | Keller | |
| 2006/0059253 A1* | 3/2006 | Goodman et al. | 709/223 |

FOREIGN PATENT DOCUMENTS

WO 01/93020 A 12/2001

OTHER PUBLICATIONS

International Search Report and Written Opinion from PCT/US2008/082093, mailed Feb. 17, 2009, 13 pages.

* cited by examiner

*Primary Examiner* — Don Wong
*Assistant Examiner* — Belinda Xue
(74) *Attorney, Agent, or Firm* — Banner & Witcoff, Ltd.; Michael Springs (57) ABSTRACT

An architecture record can be created for a computer system that includes a plurality of computing devices, each having an operating system. The architecture record includes platform definition architectures each associated with one of the computing devices and the operating system of the computing device, domain reference architectures each associated with one or more of the platform definition architectures and a service performed by the computing device of each platform definition architecture, and channel reference architectures each associated with one or more of the domain reference architectures, wherein the computing devices associated with the one or more domain reference architectures are configured to communicate with each other while performing the respective services associated with the one or more domain reference architectures.

11 Claims, 4 Drawing Sheets

REFERENCE ARCHITECTURE FRAMEWORK

TECHNICAL FIELD

The invention relates to an architecture record for a computer system and methods related thereto.

BACKGROUND

With the ever-increasing use of computers for nearly every aspect of business transactions, financial institutions and other large institutions often develop extremely vast and complex enterprise technology infrastructure and computing systems. Frequently, such enterprise technology infrastructure and computing systems contain a large number and variety of computing devices, such as servers, personal computers, wireless devices, etc. These computing devices include various makes and models of devices, many of which have different operating systems and software thereon. In such a system, as the number and variety of devices increases, technical support costs increase as well. Each software update or maintenance task requires support personnel to work on numerous different hardware platforms, and implementation of new technology within the system becomes an increasingly difficult and time consuming task. A need exists for a standard process for understanding the total impact such technologies will have on environmental complexity and operational costs, as well as techniques for reducing the time, expense, risk, variability, and difficulty of implementing new technologies within the system, as well as improving quality of the system.

BRIEF SUMMARY

The present system and method are provided to solve the problems discussed above and other problems, and to provide advantages and aspects not provided by prior systems and methods of this type.

Aspects of the present invention relate to a method of creating an architecture record for a system including a plurality of computing devices, each computing device having an operating system. The architecture record may comprise of a plurality of platform definition architectures, domain reference architectures, and channel reference architectures, all of which are stored in a memory. The platform definition architectures are each associated with one of the computing devices and the operating system of the computing device. The domain reference architectures are each associated with one of the plurality of platform definition architectures and a service performed by the computing device of the platform definition architecture. The channel reference architectures are each associated with one or more of the domain reference architectures, wherein the computing devices associated with the one or more domain reference architectures are configured to communicate with each other while performing the respective services associated with the one or more domain reference architectures.

According to one aspect, the plurality of computing devices includes at least one web server, at least one application server, and at least one database server. Additionally, one of the channel reference architectures is associated with a domain reference architecture for a web server, a domain reference architecture for an application server, and a domain reference architecture for a database server, where the web server, the application server, and the database server are configured to communicate with each other.

Aspects of the invention also relate to a catalog for use with a system as described above. The catalog includes an architecture record as described above and a rating associated with each channel reference architecture, each domain reference architecture, and each platform definition architecture. The rating reflecting the desirability of the channel reference architecture, domain reference architecture, or platform definition architecture for future use.

Additional aspects of the invention relate to a system that includes a plurality of computing devices and a memory, each computing device having an operating system, and each computing device configured to perform a service. The memory stores information including an architecture record as described above.

Further aspects of the invention relate to a method of implementing a new technology for a system that includes a plurality of computing devices, each computing device having an operating system. An architectural record is provided, as described above. One or more of the channel reference architectures, domain reference architectures, or platform definition architectures is evaluated for use in implementing the new technology, based on a set of requirements for implementing the new technology, to determine whether each of the one or more channel reference architectures, domain reference architectures, or platform definition architectures is acceptable for implementing the new technology. If one of the channel reference architectures, domain reference architectures, or platform definition architectures is determined to be acceptable, the new technology is implemented using the computing devices, operating systems, and services associated with the acceptable reference architecture.

Still further aspects of the invention relate to a method of implementing a new technology for a system that includes a plurality of computing devices, each computing device having an operating system. An architecture record is created, documenting the computing devices, the operating system for each computing device, a service performed by each computing device, and communication channels existing between the computing devices. A configuration of computing devices, operating systems, services, and communication channels is determined for implementing the new technology. The determination is based on evaluation of the architecture record using a set of requirements for implementing the new technology. The new technology is then implemented using the determined configuration.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

To understand the present invention, it will now be described by way of example, with reference to the accompanying drawings in which.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made.

Figure 1:
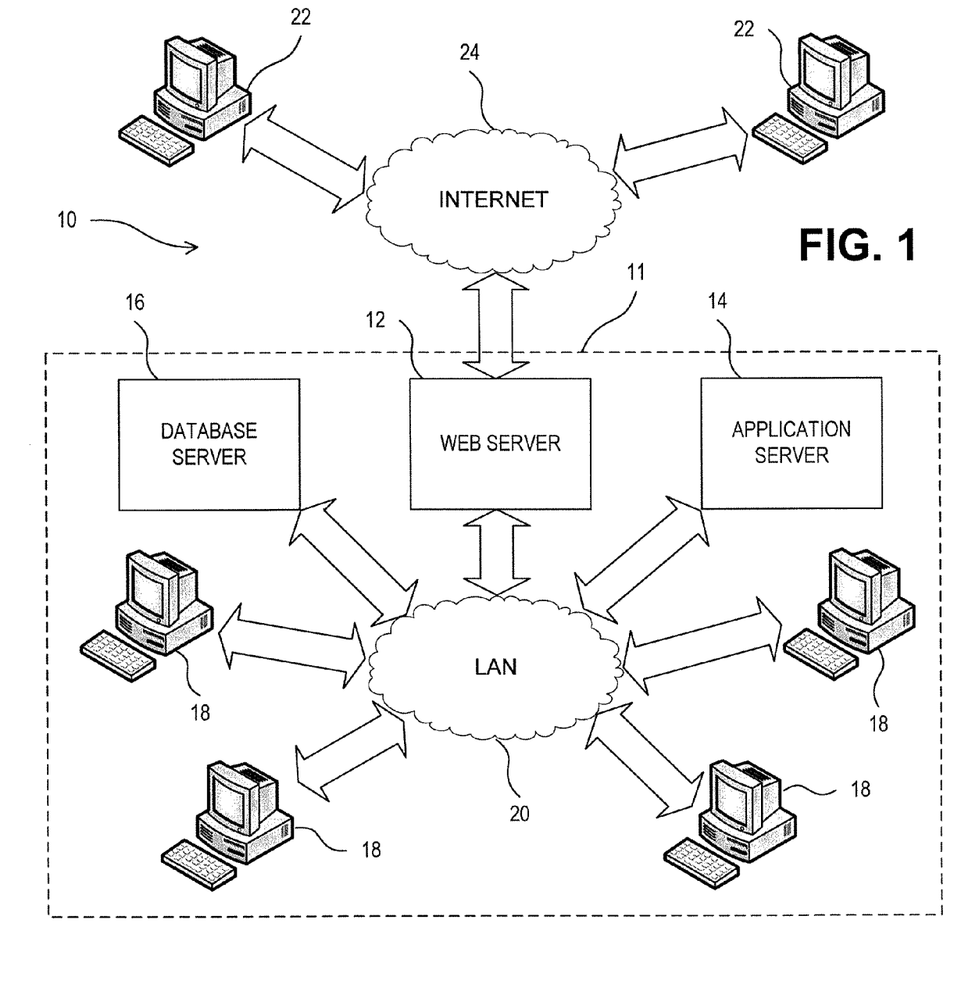
FIG. 1 is a block diagram of one embodiment of a computer system suitable for use with the present invention.

FIG. 1 illustrates an example of a system 10 that is capable of utilizing aspects of the present invention. Aspects of the present invention may be used by or in connection with a bank or other financial institution 11, such as an investment firm or other business, or a government institution, but may also be used with any other institution having such a system. The system 10 includes a plurality of computers or computing devices, including a web server 12, an application server 14, a database server 16, and several personal computers or terminals 18. The computing devices are connected to each other through a variety of communication channels, such as over a local area network (LAN) 20 or over a wide area network (WAN) 24, such as the Internet. In addition, the web server 12 provides connections to a variety of devices 22 over the LAN 20 or the WAN 24. It is understood that the diagram of FIG. 1 is intended to be illustrative, and that the system 10 may have a large number of computing devices, including a plurality of web servers 12, application servers 14, database servers 16, and terminals 18, which are all connected in many different and complex configurations over a plurality of communication channels.

Figure 2:
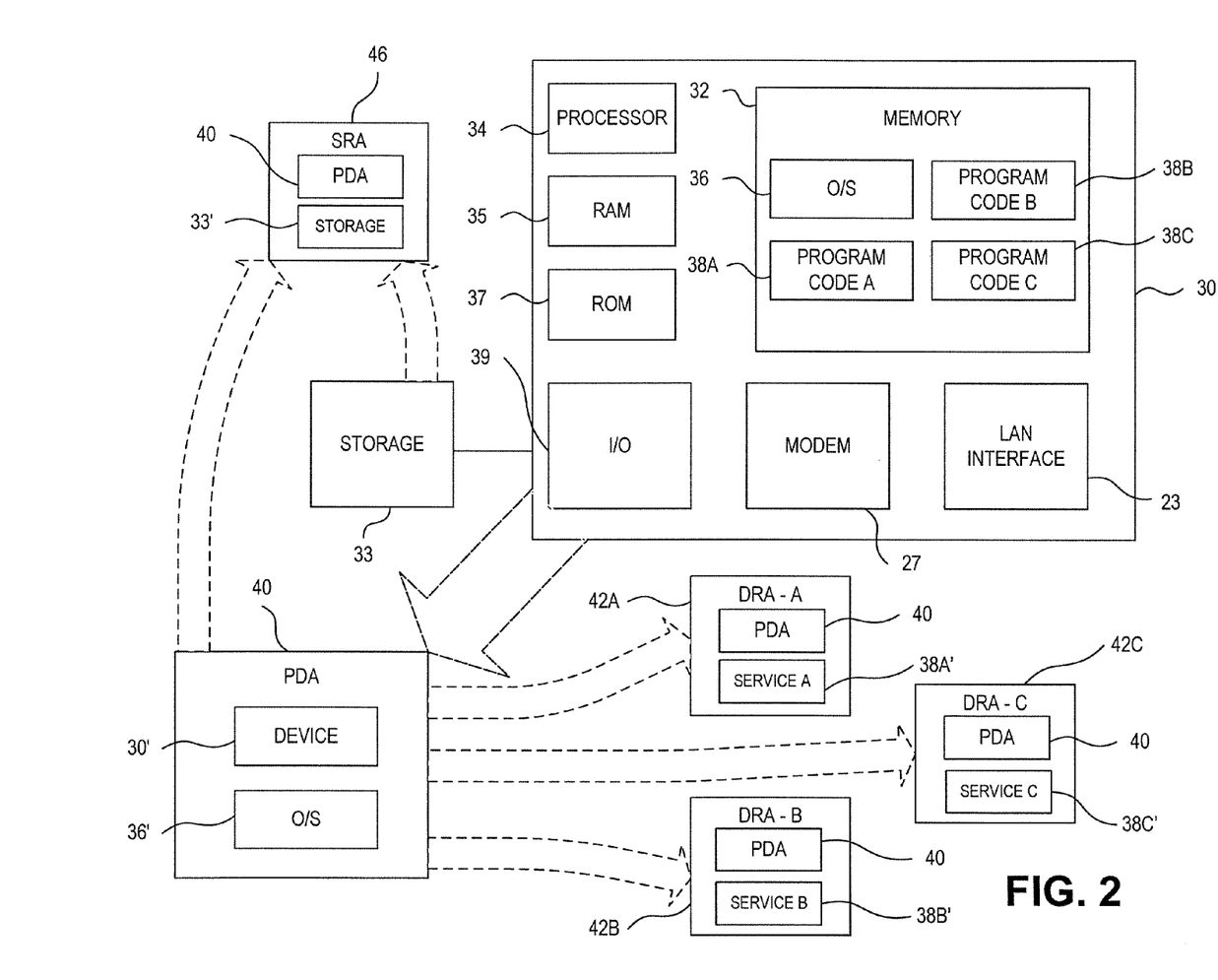
FIG. 2 is a block diagram of a computing device of the computer system of FIG. 1 and several architectures related thereto.

FIG. 2 illustrates one embodiment of a generic computing device 30 that may be used within the system 10, which may be a web server 12, an application server 14, a database server 16, a terminal 18, or any other type of computer component that may be connected or included within the system 10. The computing device 30 may have a processor 34 for controlling overall operation of the server and its associated components, including RAM 35, ROM 37, input/output module 39, and memory 32. I/O 39 may include a microphone, keypad, touch screen, and/or stylus through which a user of device 30 may provide input, and may also include one or more of a speaker for providing audio output and a video display device for providing textual, audiovisual and/or graphical output. Software may be stored within memory 32 and/or storage 33 to provide instructions to processor 34 for enabling the computing device 30 to perform various functions. For example, memory 32 may store software used by the computing device 30, such as an operating system 36. The device 30 is also configured to perform at least one service, and contains program code 38A, 38B, 38C in the memory 32 for performing each service. The program code 38A, 38B, 38C may be, for example, code for an application executed by the device 30 or code for a container operated by the device 30. It is also understood that the service may be performed by several applications and/or containers in the device 30 operating at once. The memory 32 may also contain a database (not shown) to provide centralized storage of information for the institution 11, allowing interoperability between different elements of the institution residing at different physical locations. Typically, each device 30 will have a single operating system 36, although in some instances, a device 30 can have more than one operating system 36. A storage device 33, which may be internal or external, is also shown connected to the device 30. It is understood that a single processor 34, a single memory 32, and a single storage device 33 are shown and described for sake of simplicity, and that a device 30 of the system 10 may include a plurality of processors, memories, and/or storage devices. It is also understood that "storage device" and "memory" are not intended to be exclusive terms, and that the storage device 33 may serve as a portion of the memory.

The device 30 may operate in a networked environment supporting connections to one or more remote devices 30, such as personal computers or servers that include many or all of the elements described above relative to the device 30. Referring back to FIG. 1, when used in a LAN networking environment, the device 30 is connected to the LAN 20 through a network interface or adapter 23. When used in a WAN networking environment, the device 30 may include a modem 27 or other means for establishing communications over the WAN 24. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration or a loosely coupled configuration, to permit a client based system to communicate with a server based system. Any of various conventional web browsers can be used to display and manipulate data on web pages. Additionally, an application program used by the device 30 according to an illustrative embodiment of the invention may include computer executable instructions for invoking user functionality related to communication, such as email, short message service (SMS), and voice input and speech recognition applications. It is understood that any particular device in the system 10 may include less than all of the features described above with respect to the device 30, and may also contain additional features not described herein.

According to aspects of the invention, an architecture record is created documenting the computing devices 30, the operating system 36 for each computing device, a service performed by each computing device 30, and communication channels existing between the computing devices. In this way, the architecture record acts as a "blueprint" or record of the design, layout, and configuration of the system 10. In one exemplary embodiment, the architecture record is an electronic document or documents stored in a computer-readable medium, such as the memory 32 of one or more of the computing devices 30 of the system 10. However, the architecture record could be embodied in a different form, such as a paper document or documents.

An exemplary embodiment of the architecture record is made up of smaller records, including one or more platform definition architectures, domain reference architectures, and channel reference architectures. As shown in FIG. 2, a platform definition architecture (PDA) 40 is associated with each of the computing devices 30 and the operating system 36 of the computing device 30, and contains references 30' and 36' to the computing device 30 and operating system 36, respectively. In this embodiment, each computing device 30 has its own platform definition architecture. Additionally, if the computing device 30 has more than one operating system 36, the computing device 30 will have more than one platform definition architecture 40 associated therewith.

As also shown in FIG. 2, a domain reference architecture (DRA) 42A, 42B, 42C is associated with the platform definition architecture 40 and a service performed by the computing device 30 of the platform definition architecture 40. In this embodiment, the services are represented by the program codes 38A, 38B, 38C used by the device 30 to provide the corresponding service, and each domain reference architecture 42A, 42B, 42C contains a reference 38A', 38B', and 38C' to each of the services 38A, 38B, 38C, respectively. Accordingly, as seen from FIG. 2, a device 30 that is operational is represented by the associated platform definition architecture 40 in the architectural record, and each combination of the computing device 30 and a service performed thereby is represented by the associated domain reference architecture in the architecture record. In one embodiment, a domain reference architecture may be associated with more than one platform definition architecture, however a domain reference architecture will generally be associated with only a single service. For example, a domain reference architecture may contain platform definition architectures for each of a plurality of CPU's located in a single piece of hardware, and a service performed by the CPU's. In another example, a domain reference architecture may contain platform definition architectures for several devices that represent alternate options for performing the same service, such as devices that are capable of handling different expected capacities or scales of use. A channel reference architecture generally represents a communication channel between the computing devices of two or more domain reference architectures, associated with the services performed by each device, as described below.

Figure 3:
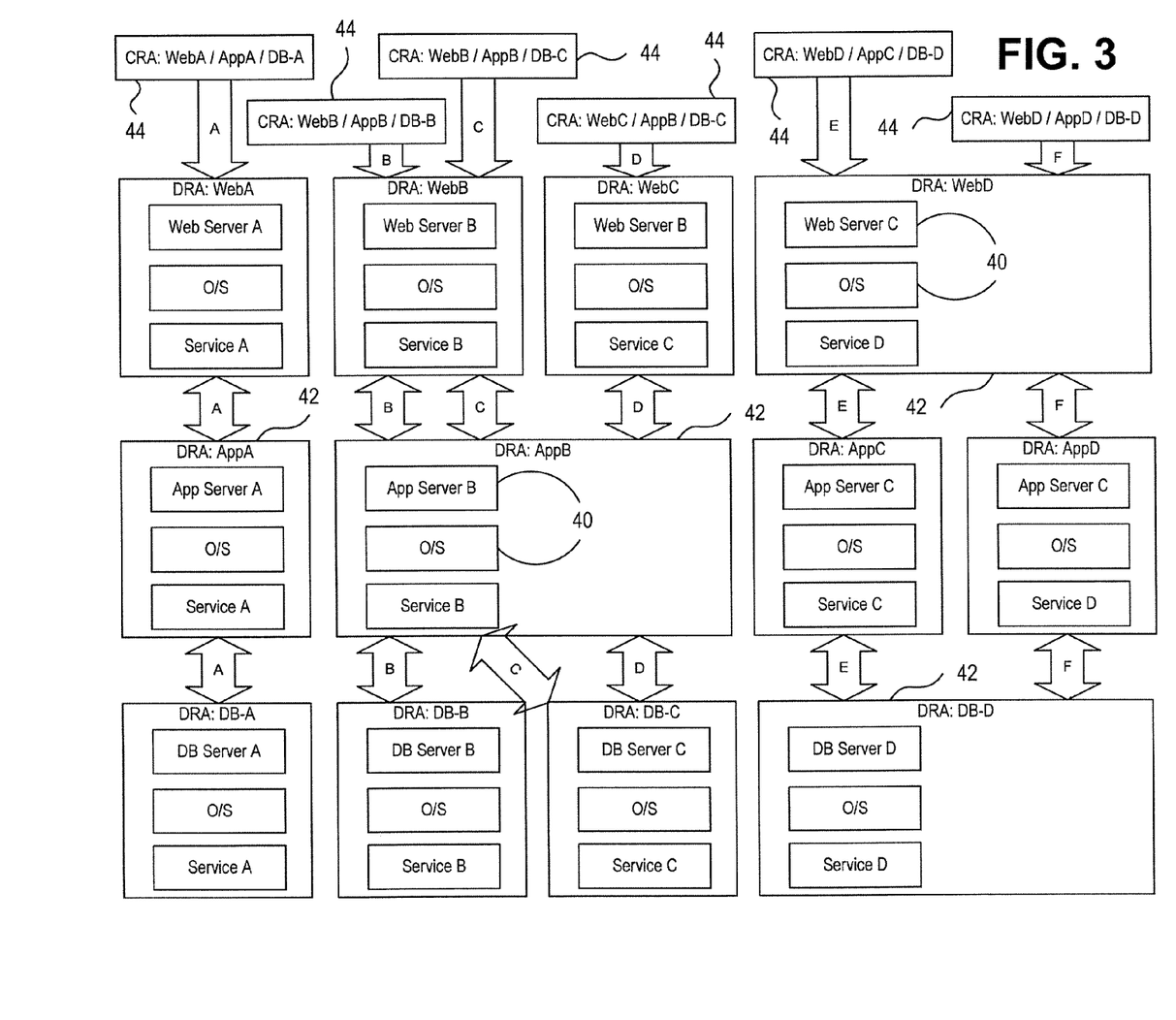
FIG. 3 is a schematic diagram of one embodiment of an architecture record for a computer system.

FIG. 3 illustrates a simplified example of an architecture record as described herein, including platform definition architectures 40, domain reference architectures 42, and channel reference architectures 44. The platform definition architectures 40 and domain reference architectures 42 in this example are similar to those shown in FIG. 2. The channel reference architecture 44 is associated with two or more of the domain reference architectures 42, where the computing devices 30 associated with the two or more domain reference architectures 42 are configured to communicate with each other while performing the respective services associated with the two or more domain reference architectures 42. In other words, the channel reference architecture represents a communication channel that has been configured between two or more computing devices in the system, with reference to the operating systems of, and services performed by, such devices. It is understood that the communication channel can include any type of channel or agreed-upon contract for communication between two devices. It is also understood that a channel reference architecture may be associated with two or more domain reference architectures associated with the same device, for example, when a single device performs more than one service. In this sense, a single device may be considered to communicate with itself and between its own internal components, within the scope of the communication channels defined herein. In another embodiment, a channel reference architecture may be associated with only a single domain reference architecture, such as when only a single device and service are used in performing a specific function.

As seen in FIG. 3, each domain reference architecture 42 can be associated with one or a plurality of channel reference architectures 44. In the embodiment shown in FIG. 3, the domain reference architectures 42 in the top row are associated with web servers 12, the domain reference architectures 42 in the middle row are associated with application servers 14, and the domain reference architectures 42 in the bottom row are associated with database servers 16. Accordingly, in this embodiment, the channel reference architectures 44 illustrate communication channels between a web server 12, an application server 14, and a database server 16, when specific services are being performed by each server 12, 14, 16 to accomplish an end result. It is understood that FIG. 3 represents a simplified version of the architecture record, and that in a large and complex system, such as a computer system for a large financial institution, a much larger number of devices and services may be incorporated into the system 10. Thus, the resultant architecture record may contain a much larger number and more complex arrangement of platform definition architectures, domain reference architectures, and channel reference architectures.

In some embodiments, the architecture record may contain further architectures for identification of other devices and configurations within the system. In one example, the architecture record contains storage reference architectures, which are associated with a platform definition architecture and a storage device connected to the corresponding computing device 30. Such a storage device may be a hard disk, a disk drive, a memory card reader, or any other identifiable storage device. FIG. 2 illustrates a storage device 33 connected to the device 30, as well as a storage reference architecture (SRA) 46 associated with the platform definition architecture 40. As shown in FIG. 2, the storage reference architecture 46 documents the computing device 30, the operating system 36 thereof, and the storage device 33 connected to the device 30, and contains a reference 33' to the storage device 33. Each additional storage device 33 that may be connected to the device 30 is associated with a different storage reference architecture.

In another example, the architecture record contains implemented reference architectures, which are associated with communication channels that have been configured between specific computing devices, but which are not yet in use within the system 10. The implemented reference architectures may be associated with communication channels that have been configured with computing devices 30 that are currently in use, or with computing devices 30 that have not yet been used, or a combination thereof. Additionally, in some embodiments, operating systems 36 or service code 38 may or may not be installed on the computing devices 30 in the implemented reference architecture. Accordingly, an implemented reference architecture may or may not be associated with an operating system or a service for one or more of the associated computing devices, but may be "ready" to accept an operating system and/or service. In one embodiment, the implemented reference architectures may be used as an indicator of an "inventory" of configurations within the system that can be used to implement future technologies. Popular and/or effective configurations within the system can be built in anticipation of new technologies, and can be offered to customers seeking to implement the new technology to improve efficiency. Since building and configuring a communication channel can take a significant period of time (often six months or more), these implemented reference architectures may be favored by customers when time-to-market is a primary concern.

The embodiments of the architecture record described above and shown in FIGS. 2-3 are described with reference to the platform definition architectures, domain reference architectures, and channel reference architectures, as well as other architectures. In other embodiments, the architecture record may contain the same or similar basic information for the system architecture, while being constructed and/or stored in different discrete units.

The architecture record, once created as described above, can be used for various purposes. For example, the architecture provides a useful reference for evaluating the effectiveness and efficiency of the system, and can be used to design changes or reconfigurations in the system or in performing updates and maintenance on the system. One way of evaluating the effectiveness and efficiency of the system using the architecture record is by reviewing each channel reference architecture to determine its effectiveness and efficiency, known as a governance process. A score may be generated to reflect these qualities, and in turn, this score may be used as a reference when designing and building new devices and channels in the system. High-scoring channel reference architectures, which indicate those that perform most effectively and/or efficiently, may be favored over other, lower-scoring architectures when modifying the system. In one embodiment, an institution using the architecture record may choose a number a number of highly rated and/or popular channel reference architectures and attempt to encourage reuse of these architectures for other infrastructure projects in the institution. Not only does this improve the efficiency of the system and the efficiency of choosing the architecture, but over time, it can also produce a degree of standardization throughout the system, which may be beneficial.

Additionally, a catalog may be produced of different channel reference architectures showing how each architecture scored in the governance process. It is understood that not all of the architectures in the catalog may be scored. The catalog may also divide the channel reference architectures into different categories. For example, one embodiment of the catalog includes three categories: a first category for popular and/or highly rated architectures, a second category for new and emerging architectures which may not be fully evaluated yet, and a third category for old, expensive, low-rated, or otherwise unfavorable architectures. The catalog may include an indication of how many implemented reference architectures exist for each channel reference architecture as well. Such a catalog can enhance the accessibility and usefulness of the architecture record. In one embodiment, the catalog further includes domain reference architectures, and in another embodiment, the catalog includes platform definition architectures as well, and may include ratings for each domain reference architecture and platform definition architecture.

Further, the channel reference architectures can be used to optimize maintenance of the system. Certain devices within the system may be rearranged or reconfigured so that all devices in a communication channel have similar operating systems and other software. This enables an outside vendor to perform maintenance on all devices of a channel reference architecture at once, rather than at different times. Since maintenance often requires that the devices in the communication channel are shut down and/or tested, simultaneously upgrading all devices in the communication channel requires less downtime.

The architecture record can also be used in implementing a new technology to be added to the system. Generally, a configuration of computing devices, operating systems, services, and communication channels is determined for implementing the new technology, based on evaluation of the architecture record using a set of requirements for implementing the new technology. Such a configuration may be a channel reference architecture, such as in the embodiment of the architecture record described above. If one of the configurations is found to be acceptable, the new technology is implemented using the computing devices, operating systems, and services associated with the acceptable configuration. If more than one of the configurations is found to be acceptable, one of the acceptable configurations is used. If none of the configurations is acceptable, a new configuration may be created for implementing the new technology, using at least one of a new computing device, a new operating system, a new service, and/or a new communication channel. If the new configuration is acceptable, then the new technology can be implemented using the new configuration.

Figure 4:
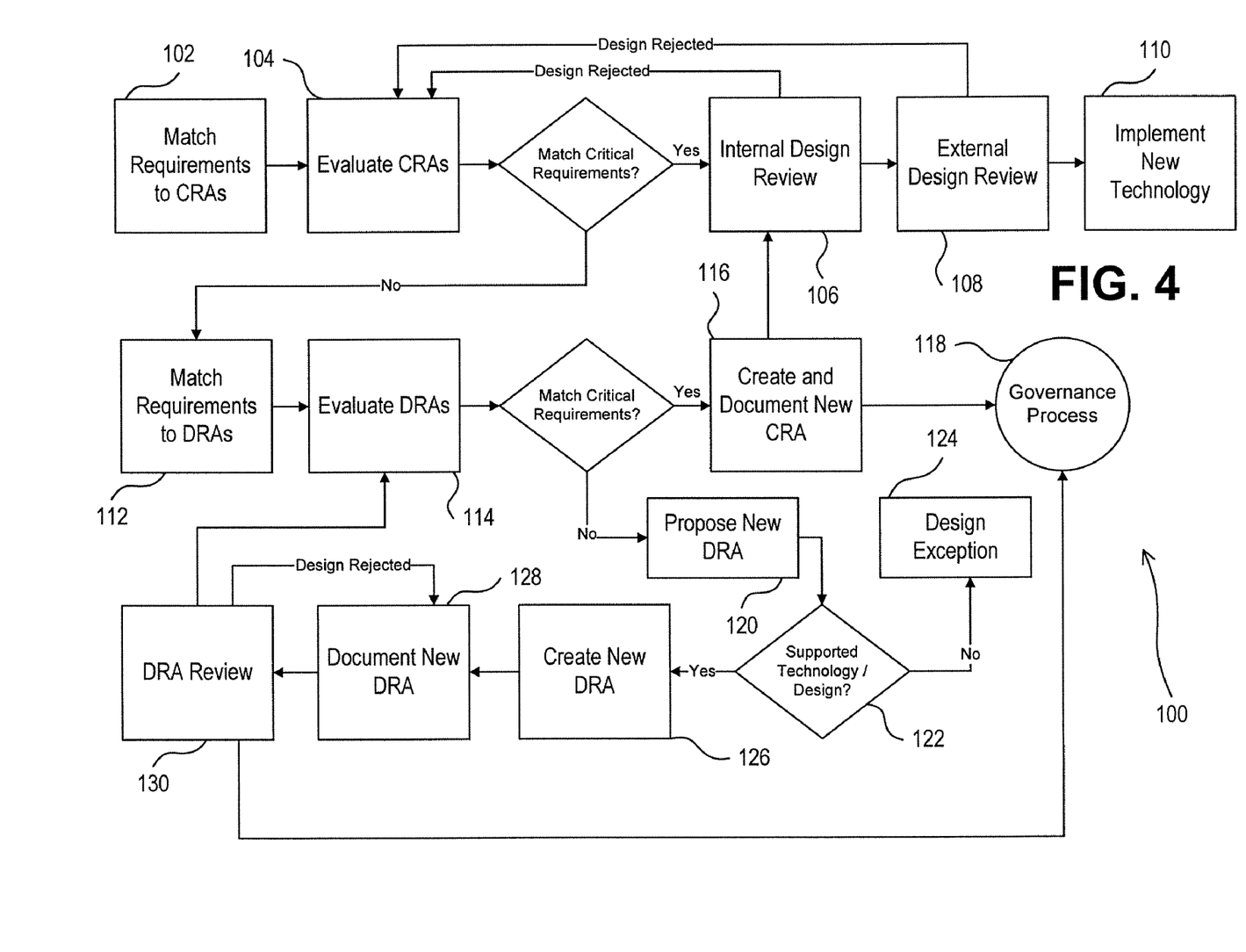
FIG. 4 is a flowchart of one embodiment of a method of implementing a new technology using an architecture record.

One embodiment of the method 100 for implementing a new technology within the system, using the architecture record, is shown in FIG. 4. At step 102, the architecture record is reviewed using a set of requirements for the new technology, to match the requirements to one or more channel reference architectures in the record. In one embodiment, a decision tree is used to select the channel reference architectures. The decision tree is a flowchart that includes a plurality of questions, and answers to the questions lead to identification of one or more channel reference architectures that may be suitable for the intended purpose. The catalog, and the architecture ratings therein, may be used in this step. Additionally, one or more of the channel reference architectures selected may be an implemented reference architecture that is ready for use.

At step 104, the one or more selected channel reference architectures are be evaluated for use in implementing the new technology, based on the set of requirements for implementing the new technology, to determine whether each of the channel reference architectures is acceptable for implementing the new technology. The catalog may be used in this step as well. In some instances, none of the channel reference architectures may meet every one of the requirements, and the evaluation process may include a trade-off of options. For example, certain requirements may be more important than others, and a customer seeking to implement the new technology may be willing to concede certain requirements to facilitate implementation of the technology. Certain requirements may be determined to be critical or not critical in this trade-off process. Thus, the channel reference architecture finally determined to be acceptable may or may not meet all of the requirements, but may represent a channel reference architecture that meets all of the critical requirements and is viewed as the best in the eyes of the customer.

If one of the channel reference architectures is determined to be acceptable, the proposed architecture design is subjected to internal design review, at step 106, and external design review, at step 108. The internal design review is conducted within the responsible organization and may be, for example, a peer review by multiple design team leads to ensure the decisions were made properly. The external design review is conducted by the customer, which may be another group or division within the institution. If either of the design reviews reject the design, the process is returned to step 104, and subsequent steps repeated. If the design passes the design reviews, then the new technology is implemented into the system using the computing devices, operating systems, services, and communication channels of the chosen channel reference architecture, at step 110. In addition, the selected channel reference architecture may be rejected based on other criteria. For example, the selected channel reference architecture may have been designated as an unfavorable or prohibited architecture, which could result in rejection. In another example, the selected channel reference architecture may involve licensing issues or other issues that a customer would want to avoid. In a further example, the selected channel reference architecture may be restricted by special use criteria. If the channel reference architecture is rejected, the architecture may yet be granted a special exception, such as by a governance board or other entity. However, if no special exemption is granted, the process will return to step 104.

If none of the channel reference architectures are acceptable, a new channel reference architecture may be created for implementing the new technology. In general, creation of a new channel reference architecture includes implementing a new computing device, a new operating system, a new service, and/or a new communication channel. A new communication channel can be created between existing devices, without changing the device's operating system or service(s). In the embodiment of FIG. 4, if none of the channel reference architectures are acceptable, the existing domain reference architectures are first evaluated to determine if a new channel reference architecture can be created from existing domain reference architectures. At step 112, the architecture record is reviewed using the set of requirements for the new technology, to match the requirements to one or more domain reference architectures in the record that may provide the required functionality missing from the existing channel reference architectures. Like step 102 described above, a decision tree and/or the catalog may be used for this step. Additionally, the set of requirements used for this step may be different from the set of requirements used in steps 102 and 104, as the trade-off process may have eliminated or lessened the priority of some requirements. In one embodiment, a prioritized set of requirements used for this step, with less critical requirements given less weight or no weight at all.

At step 114, the one or more selected domain reference architectures are evaluated for use in implementing the new technology, based on the set of requirements for implementing the new technology, to determine whether each of the domain reference architectures is acceptable for implementing the new technology. This evaluation may incorporate determining whether each domain reference architecture meets the requirements not provided by the existing channel reference architectures. The catalog may be used in this step as well. As in step 104 discussed above, in some instances, none of the domain reference architectures may meet all of the requirements, and the evaluation process may include trading-off of options. If one of the domain reference architectures allows a new channel reference architecture to be created that would meet all of the critical requirements, then the new channel reference architecture is determined to be acceptable. Again, the acceptable architecture may be selected by the customer as the best of several architectures that meet the critical requirements.

At step 116, the new channel reference architecture is created and documented in the record, which may involve inserting the architecture into the catalog for future use. Once this is completed, the process proceeds to the internal and external review at steps 106 and 108, and the new channel reference architecture can be used to implement the new technology. In implementing the new channel reference architecture, the computing devices associated with the two or more domain reference architectures are configured to communicate with each other while performing the respective services associated with the two or more domain reference architectures. Additionally, the new channel reference architecture is subjected to the governance process to determine its rating, which is indicated in the catalog, at step 118.

If none of the existing domain reference architectures can be used to create an acceptable configuration, a new domain reference architecture may be proposed for implementing the new technology, at step 120. In general, creation of a new domain reference architecture includes implementing a new computing device, a new operating system, and/or a new service. In the embodiment shown in FIG. 4, the design team determines whether the proposed domain reference architecture can be created with the technology that is currently supported by the system, at step 122. If the proposed domain reference architecture cannot be currently supported, then a design exception is made, at step 124. In the design exception, notifications are sent to team leaders, managers, governance boards, etc., to allow them to review and comment on the proposed architecture. The customer may, in the end, be notified that construction of an architecture to meet the critical requirements will be extremely expensive or impossible, which allows the customer to reconsider the critical requirements.

If the proposed domain reference architecture can be supported, then the new domain reference architecture is created, at step 126, and documented, at step 128. In one embodiment, the creation of a new domain reference architecture may involve evaluation and selection among existing platform definition architectures to create the new domain reference architecture, or may involve creation of a new platform definition architecture. In such a case, the evaluation and selection or creation of the platform definition architecture can be done in a similar manner to the evaluation and selection or creation of the new domain reference architecture, as described above. For example, a new platform definition architecture can be created by combining a selected computing device with a selected operating system.

The new domain reference architecture is also subjected to an internal review, at step 130. If the internal review rejects the new domain reference architecture, then another new domain reference architecture can be proposed, returning the process to step 120. If the domain reference architecture passes the internal review, then the process returns to step 114, where the new domain reference architecture is evaluated based on the requirements for implementing the technology. If the new domain reference architecture is accepted, then it can be used to create the new channel reference architecture and to implement the new technology, as described above. Additionally, the new domain reference architecture is subjected to the governance process and inserted into the catalog, at step 118.

As stated above, FIG. 4 illustrates an example of one or more aspects of a method for combating spoofing, protecting customer information, and preventing fraud and identity theft. The steps of the method described above can be accomplished by means and/or components contained within the system 10, such as the computing devices 30 and the memories 32 and processors 34 thereof, and may also be accomplished by non-computer means, such as by institutional employees. Other components of the system 10, may also constitute means for accomplishing aspects of the present invention, as understood by those skilled in the art. It is understood that the system 10 may not perform each and every aspect of the methods described herein, and that aspects may be outsourced to one or more other entities.

Aspects of the present invention are operational with numerous other general purpose or special purpose computing system environments or configurations. Examples of well known computing systems, environments, and/or configurations that may be suitable for use with the present invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

The architecture record and related methods described herein provide benefits and advantages over the prior art. The architecture record and catalog facilitate maintenance of the system, through providing a quick and easy reference for consultation to determine the system architecture. Additionally, the architecture record and catalog permit technical support and design personnel to determine what combinations of platforms and products are the most effective and efficient. The use of "preferred" architectures and configurations can often permit a customer requesting implementation of new technology to choose a configuration of hardware and software that is faster and less expensive to implement, if doing so would not result in the loss of critical functionality requirements. Thus, the technology may be implemented with reduced time for building and design and less employee involvement. The architecture record can also be used to achieve greater standardization throughout the system and greater automation in the system design process. Still further benefits and advantages are readily recognizable to those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is further understood that the invention may be in other specific forms without departing from the spirit or central characteristics thereof. The present examples therefore are to be considered in all respects as illustrative and not restrictive, and the invention is not to be limited to the details given herein. The term "plurality," as used herein, indicates any number greater than one, either disjunctively or conjunctively, as necessary, up to an infinite number. Accordingly, while the specific examples have been illustrated and described, numerous modifications come to mind without significantly departing from the spirit of the invention and the scope of protection is only limited by the scope of the accompanying claims.

What is claimed is:

1. A method for use in connection with a system comprising a plurality of computing devices, each computing device having an operating system, the method comprising:
    creating an architecture record for the system, the architecture record including records comprising a plurality of platform definition architectures, a plurality of domain reference architectures, and a plurality of channel reference architectures, wherein creating the architecture record comprises:
        creating, using a processor, the plurality of platform definition architectures, each platform definition architecture associated with one of the computing devices and the operating system of the computing device;
        creating, using the processor, the plurality of domain reference architectures, each domain reference architecture associated with one or more of the plurality of platform definition architectures and a service performed by the computing device of each platform definition architecture;
        creating, using the processor, the plurality of channel reference architectures, each channel reference architecture associated with one or more of the domain reference architectures and a communication channel used by one or more computing devices associated with the one or more domain reference architectures to communicate while performing the respective services associated with the one or more domain reference architectures, wherein the plurality of computing devices include a web server, an application server, and a database server, wherein one of the channel reference architectures is associated with a domain reference architecture for the web server, a domain reference architecture for the application server, and a domain reference architecture for the database server, and wherein the web server, the application server, and the database server are configured to communicate with each other using the communication channel associated with the one channel reference architecture; and
        storing the platform definition architectures, the domain reference architectures, and the channel reference architectures in memory to create the architecture record.

2. The method of claim 1, wherein the plurality of computing devices includes a plurality of web servers, a plurality of application servers, and a plurality of database servers.

3. The method of claim 1, wherein the service performed by one of the computing devices comprises an application executed by the computing device.

4. The method of claim 1, wherein one of the computing devices performs a plurality of services, and wherein each of the plurality of services has a different domain reference architecture associated therewith.

5. A method of implementing a new technology for a system comprising a plurality of computing devices, each computing device having an operating system, the method comprising:
    storing an architecture record documenting the computing devices, the operating system for each computing device, a service performed by each computing device, and communication channels existing between the computing devices, the architecture record including records comprising a plurality of platform definition architectures, each platform definition architecture associated with one of the computing devices and the operating system of the computing device, a plurality of domain reference architectures, each domain reference architecture associated with one or more of the plurality of platform definition architectures and a service performed by the computing device of each platform definition architecture, and a plurality of channel reference architectures, each channel reference architecture associated with one or more of the domain reference architectures and a communication channel used by one or more computing devices associated with the one or more domain reference architectures to communicate while performing the respective services associated with the one or more domain reference architectures, wherein the plurality of computing devices include a web server, an application server, and a database server, wherein one of the channel reference architectures is associated with a domain reference architecture for the web server, a domain reference architecture for the application server, and a domain reference architecture for the database server, and wherein the web server, the application server, and the database server are configured to communicate with each other using the communication channel associated with the one channel reference architecture;

determining a configuration of one or more computing devices, operating systems, services, and communication channels for implementing the new technology, wherein the determination comprises evaluation of the at least one of the platform definition architectures, the domain reference architectures, and the channel reference architectures, using a set of requirements for implementing the new technology to determine whether the requirements are satisfied by an existing configuration of one or more of the computing devices, the operating system for each of the one or more computing devices, the service performed by each of the one or more computing devices, and the communications channel utilized by the one or more computing devices to perform the service;

wherein the new technology is implemented using the existing configuration, when the evaluation determines that the existing configuration satisfies the requirements.

6. The method of claim 5, wherein the existing configuration comprises two or more computing devices connected by an existing communication channel, the operating system for each of the two or more computing devices, the service performed by each of the two or more computing devices, and the existing communication channel between the two or more computing devices.

7. The method of claim 5, wherein evaluation of the architecture record reveals that none of the existing communication channels in the architecture record satisfy the requirements for the new technology, further comprising:

creating a new configuration to satisfy the requirements for the new technology, using at least one of a new computing device, a new operating system, a new service, and a new communication channel, wherein the new technology is implemented using the new configuration.

8. The method of claim 7, wherein creating the new configuration comprises creating a new communication channel using two or more existing computing devices, the operating system for each of the two or more computing devices, and the service performed by each of the two or more computing devices.

9. The method of claim 5, wherein the service performed by one of the computing devices comprises an application executed by the computing device.

10. The method of claim 5, wherein one of the computing devices performs a plurality of services, and the architecture record documents each of the plurality of services performed by the computing device.

11. A non-transitory tangible computer-readable medium containing computer-executable code configured to cause one or more computer processors to perform:

creating an architecture record including records comprising a plurality of platform definition architectures, a plurality of domain reference architectures, and a plurality of channel reference architectures, wherein creating the architecture record comprises:

creating the plurality of platform definition architectures, each platform definition architecture associated with one of a plurality of computing devices including a web server, an application server, and a database server and an operating system of the computing device;

creating the plurality of domain reference architectures, each domain reference architecture associated with one or more of the plurality of platform definition architectures and a service performed by the computing device of each platform definition architecture;

creating the plurality of channel reference architectures, each channel reference architecture associated with one or more of the domain reference architectures and a communication channel used by one or more computing devices associated with the one or more domain reference architectures to communicate with each other while performing the respective services associated with the one or more domain reference architectures, wherein one of the channel reference architectures is associated with a domain reference architecture for the web server, a domain reference architecture for the application server, and a domain reference architecture for the database server, and wherein the web server, the application server, and the database server are configured to communicate with each other using the communication channel associated with the one channel reference architecture; and storing the platform definition architectures, the domain reference architectures, and the channel reference architectures in memory to create the architecture record.

\* \* \* \* \*